(12) United States Patent
Mullin (10) Patent No.: US 10,432,430 B2
(45) Date of Patent: Oct. 1, 2019

(54) TRIGGERING AN IDENTIFICATION SIGNAL BROADCAST OF A FIRST NAVIGATIONAL AID EQUIPMENT USING A TONE IN THE VOICE BAND TRANSMITTED BY A SECOND NAVIGATIONAL AID EQUIPMENT

(71) Applicant: THALES USA, INC., Arlington, VA (US)

(72) Inventor: Richard Mullin, Shawnee, KS (US)

(73) Assignee: THALES USA, INC., Arlington, VA (US)

(*) Notice: Subject to any disclaimer, the term of this patent is extended or adjusted under 35 U.S.C. 154(b) by 0 days.

(21) Appl. No.: 15/641,909

(22) Filed: Jul. 5, 2017

(65) Prior Publication Data
US 2018/0013589 A1 Jan. 11, 2018

Related U.S. Application Data

(60) Provisional application No. 62/360,142, filed on Jul. 8, 2016.

(51) Int. Cl.
| | | |
|---|---|---|
| *G08C 19/12* | (2006.01) | |
| *H04L 17/02* | (2006.01) | |
| *H04L 15/04* | (2006.01) | |
| *B64D 45/04* | (2006.01) | |
| *G01S 1/16* | (2006.01) | |
| *G01S 1/18* | (2006.01) | |
| *G08G 5/02* | (2006.01) | |
| *H04L 29/08* | (2006.01) | |
| *G08G 5/00* | (2006.01) | |

(52) U.S. Cl.
CPC ............ *H04L 15/04* (2013.01); *B64D 45/04* (2013.01); *G01S 1/16* (2013.01); *G01S 1/18* (2013.01); *G08G 5/0013* (2013.01); *G08G 5/0026* (2013.01); *G08G 5/025* (2013.01); *H04L 67/12* (2013.01)

(58) Field of Classification Search
CPC ......... H04L 15/04; H04L 67/12; B64D 45/04; G01S 1/18; G01S 1/16; G08G 5/025
USPC ...................................................... 341/173
See application file for complete search history.

(56) References Cited

U.S. PATENT DOCUMENTS

| 4,651,158 A * | 3/1987 | Nelson ................. G01S 13/788 342/47 |
| 6,072,994 A * | 6/2000 | Phillips ................ G01S 13/767 375/219 |
| 2005/0187677 A1 * | 8/2005 | Walker ................... B64C 13/20 701/16 |

OTHER PUBLICATIONS

International Search Report of related International Patent Application No. PCT/US2017/041207 dated Sep. 25, 2017.

* cited by examiner

Primary Examiner — Tanmay K Shah (57) ABSTRACT

Aspects of the present invention relate to methods, systems, and computer-readable media for triggering an identification signal broadcast of a first navigational aid equipment using a tone in the voice band transmitted by a second navigational aid equipment. Aspects include receiving, at the first navigational aid equipment, a tone in a voice band of second navigational aid equipment. Aspects also include transmitting, by the first navigational aid equipment, the identification associated with the first navigational aid equipment identification when the tone is received.

19 Claims, 6 Drawing Sheets

TRIGGERING AN IDENTIFICATION SIGNAL BROADCAST OF A FIRST NAVIGATIONAL AID EQUIPMENT USING A TONE IN THE VOICE BAND TRANSMITTED BY A SECOND NAVIGATIONAL AID EQUIPMENT

CROSS-REFERENCE TO RELATED APPLICATIONS

This application claims priority to U.S. Provisional Patent Application No. 62/360,142, filed Jul. 8, 2016. The disclosure of the priority application is incorporated in its entirety herein by reference.

TECHNICAL FIELD

The present disclosure relates generally to the field of avionics, and more specifically to devices, systems, and methods for triggering an identification signal broadcast of a first navigational aid equipment using a tone in the voice band transmitted by a second navigational aid equipment.

BACKGROUND

Pilots generally rely on instrument landing systems (ILSs), and/or distance measuring equipment (DME) to aid with navigation and landing when flying during periods of low visibility or inclement weather.

The ILS is a ground-based instrument approach system that provides aircraft with lateral guidance (e.g., from localizer antenna array) and vertical guidance (e.g., glide slope antenna array) while approaching and landing on a runway. In principle, an aircraft approaching a runway is guided by ILS receivers in the aircraft that perform modulation depth comparisons of signals transmitted by a localizer antenna array located at the end of the runway and by a glide slope antenna array located to one side of the runway touchdown zone. In addition to the lateral and vertical navigation information the Localizer identifies the ILS system by transmitting a unique Morse code identifier. The ILS signal format also includes a provision for a voice signal that is not currently in use. When a DME is included as part of an ILS, it also provides a Morse Code identification that is the same as that provided by the associated Localizer. The Morse Code signals must be time synchronized to assure that only the Localizer or the DME identification is broadcast at any one time.

For navigation, two signals are transmitted by the localizer from co-located antennas within the array. One signal is modulated at a first frequency (e.g., 90 Hz), while the other signal is modulated at a second frequency (e.g., 150 Hz). Each of the co-located antennas transmits a narrow beam, one slightly to the left of the runway centerline, the other slightly to the right of the runway centerline. The localizer receiver in the aircraft measures the difference in the depth of modulation (DDM) of the first signal (e.g., 90 Hz) and the second signal (e.g., 150 Hz). The depth of modulation for each of the modulating frequencies is 20 percent when the receiver is on the centerline. The difference between the two signals varies depending on the deviation of the approaching aircraft from the centerline. The pilot controls the aircraft so that a localizer indicator (e.g., cross hairs) in the aircraft remains centered on the display to provide lateral guidance. The same transmitter also transmits a Morse Code identification signal. This allows the pilot to positively identify the ILS system. The depth of modulation for the Morse Code is between 5% and 15%.

Similarly, the glide slope (GS) antenna array transmits a first signal modulated at a first frequency (e.g., 90 Hz) and a second signal modulated at a second frequency (e.g., 150 Hz). The two GS signals are transmitted from co-located antennas in the GS antenna array. The center of the GS signal is arranged to define a glide path of a predetermined slope (e.g., 3°) above the ground level for the approach of the aircraft. The pilot controls the aircraft so that a guide slope indicator (e.g., cross hairs) remains centered on the display to provide vertical guidance during landing. The Glide slope does not have a provision for Morse Code transmission.

Navigational aid systems may include an ILS that is made of a localizer, a glide slope, and DME. As discussed supra, the localizer provides horizontal guidance and the glide slope provides vertical guidance to an aircraft approaching a runway. The DME may be collocated with the localizer or the glide slope. The localizer, glide slope, and DME may be identified by an aircraft using synchronized identification signals broadcast from the Localizer and DME. The localizer may broadcast respective identifications using a frequency of the voice band. In conventional navigation aid systems, the broadcast of the identification signal of the DME is triggered using a synchronization signal received from the localizer using a cable connection. For example, when the DME is located remote from the localizer, a cable that may be several miles long may be used to connect the DME to the localizer and/or glide slope. However, this configuration may be inconvenient and expensive.

Therefore, there exists an unmet need in the art for methods, apparatuses, and computer-readable media to trigger a synchronized broadcast of the DME identification without using an expensive cable connection.

SUMMARY

Aspects of the present invention relate to methods, systems, and computer-readable media for triggering an identification signal broadcast of a first navigational aid equipment using a tone in the voice band transmitted by a second navigational aid equipment. Aspects include receiving, at the first navigational aid equipment, a tone in a voice band of second navigational aid equipment. Aspects also include transmitting, by the first navigational aid equipment, the identification associated with the first navigational aid equipment identification when the tone is received.

Additional advantages and novel features of these aspects will be set forth in part in the description that follows, and in part will become more apparent to those skilled in the art upon examination of the following or upon learning by practice of the disclosure.

BRIEF DESCRIPTION OF THE DRAWINGS

The accompanying drawings, which are incorporated into and constitute a part of this specification, illustrate one or more example aspects of the invention and, together with the detailed description, serve to explain their principles and implementations.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of a method for triggering an identification signal broadcast from a first navigational aid equipment will now be presented with reference to various methods, apparatuses, and media. These methods, apparatuses, and media will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall implementation.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, discrete radio frequency (RF) circuits, and other suitable hardware configured to perform the various functionality described throughout this disclosure. One or more processors in the processing system may execute software. Software shall be construed broadly to include instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium or media. Computer-readable media includes computer storage media. Storage media may be any available media that is able to be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that may be used to carry or store desired program code in the form of instructions or data structures and that may be accessed by a computer. Disk and disc, as used herein, include CD, laser disc, optical disc, digital versatile disc (DVD), and floppy disk, where disks usually reproduce data magnetically, while discs reproduce data optically with lasers. Combinations of the above should also be included within the scope of computer-readable media.

Aspects of a method, apparatus, and computer-readable medium presented herein may be configured to trigger an identification signal broadcast of a first navigational aid equipment using a tone in the voice band transmitted by a second navigational aid equipment. The method, apparatus, and computer-readable medium may be configured to trigger an identification signal broadcast of a first navigational aid equipment using a tone in the voice band transmitted by a second navigational aid equipment with ILS or any other application where a DME and its associated navigation are not located together. Although the description set forth below primarily refers to a DME, localizer, and glideslope it should be understood that the methods, apparatuses, and computer-readable media of the present disclosure may be used with other navigation aid systems without departing from the scope of the present disclosure.

Navigational aid systems may include an ILS that is made of a localizer, a glide slope, and DME. As discussed supra, the localizer provides horizontal guidance and the glide slope provides vertical guidance to an aircraft approaching a runway. The DME may be collocated with the localizer or the glide slope. The localizer and DME may be identified by an aircraft using synchronized identification signals broadcast from each of the stations in the ILS. The localizer may broadcast respective identifications using a frequency of the localizer voice band. In conventional navigation aid systems, the broadcast of the identification signal of the DME is triggered using a synchronization signal received from the localizer using a cable connection. For example, when the DME is located remote from the localizer a cable that may be several miles long may be used to connect the DME to the localizer. However, this configuration may be quite expensive.

To avoid the need for a cable connection and/or radio link for triggering the DME to broadcast a synchronized identification, the navigation aid system of the present disclosure triggers the DME to broadcast a synchronized identification by including an additional tone in the voice band that is broadcast by the localizer.

Figure 1A:
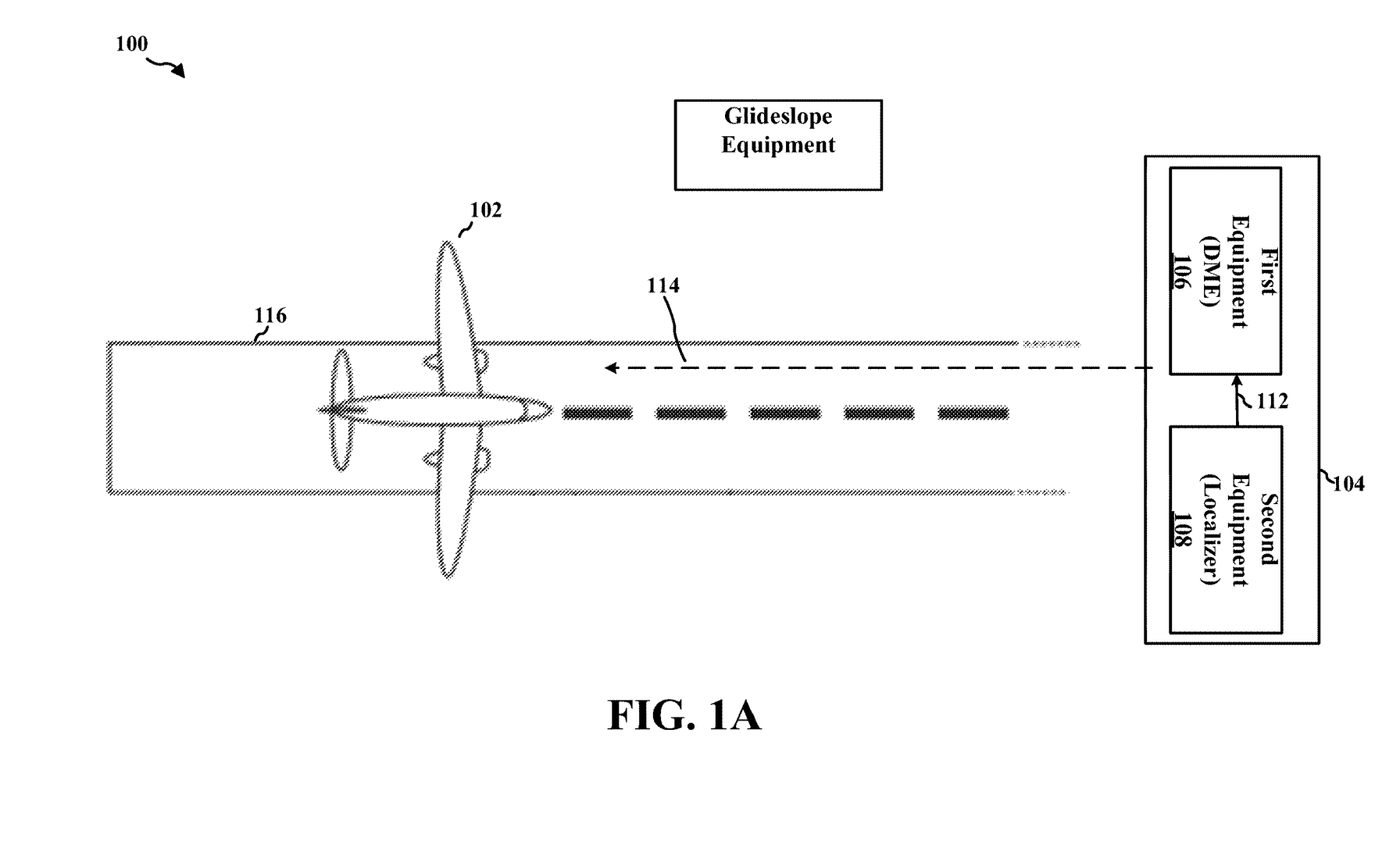
FIG. 1A is a diagram illustrating one example of a system in accordance with various aspects of the present disclosure.
Figure 1B:
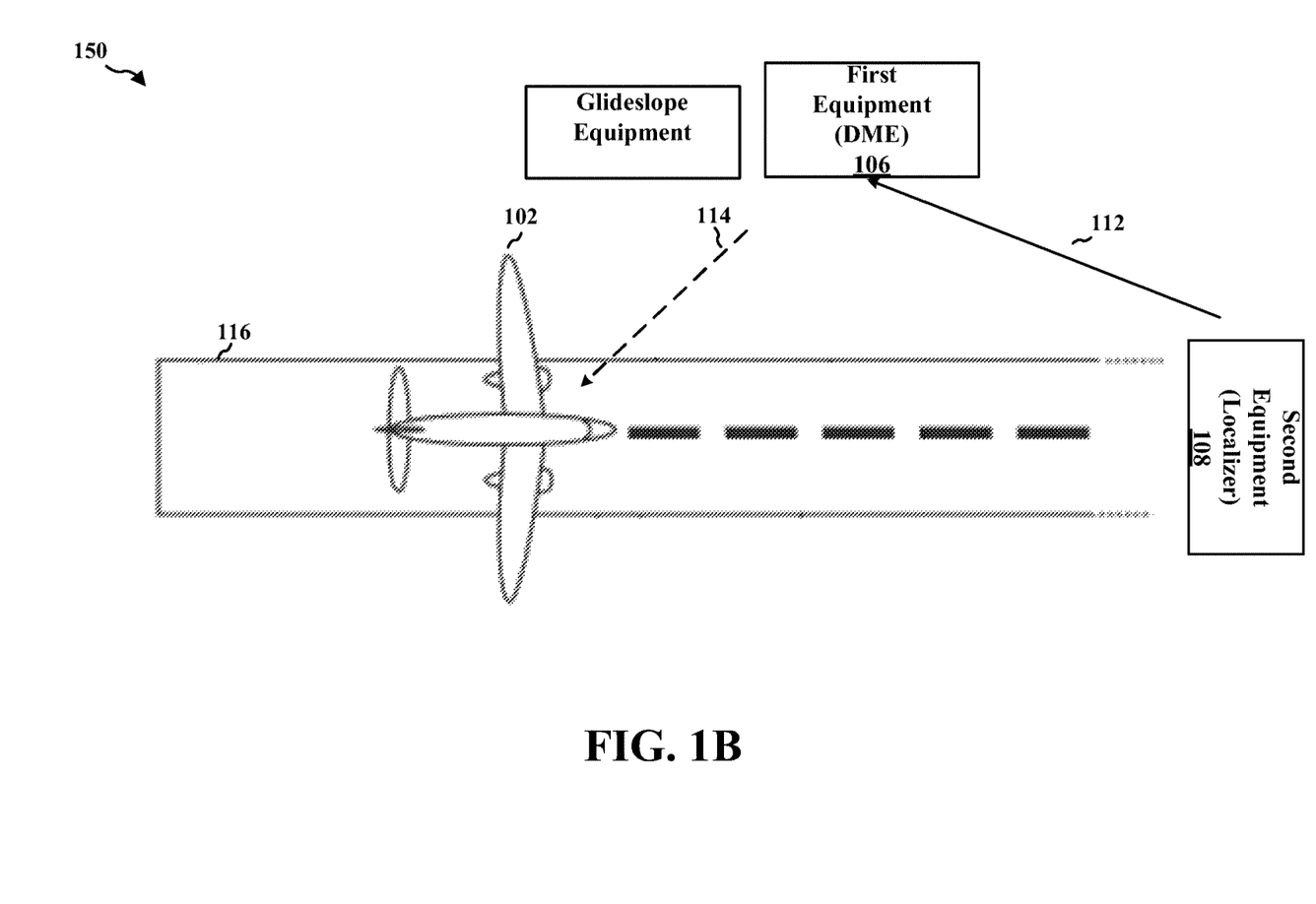
FIG. 1B is a diagram illustrating one example of a system in accordance with various aspects of the present disclosure.
Figure 1C:
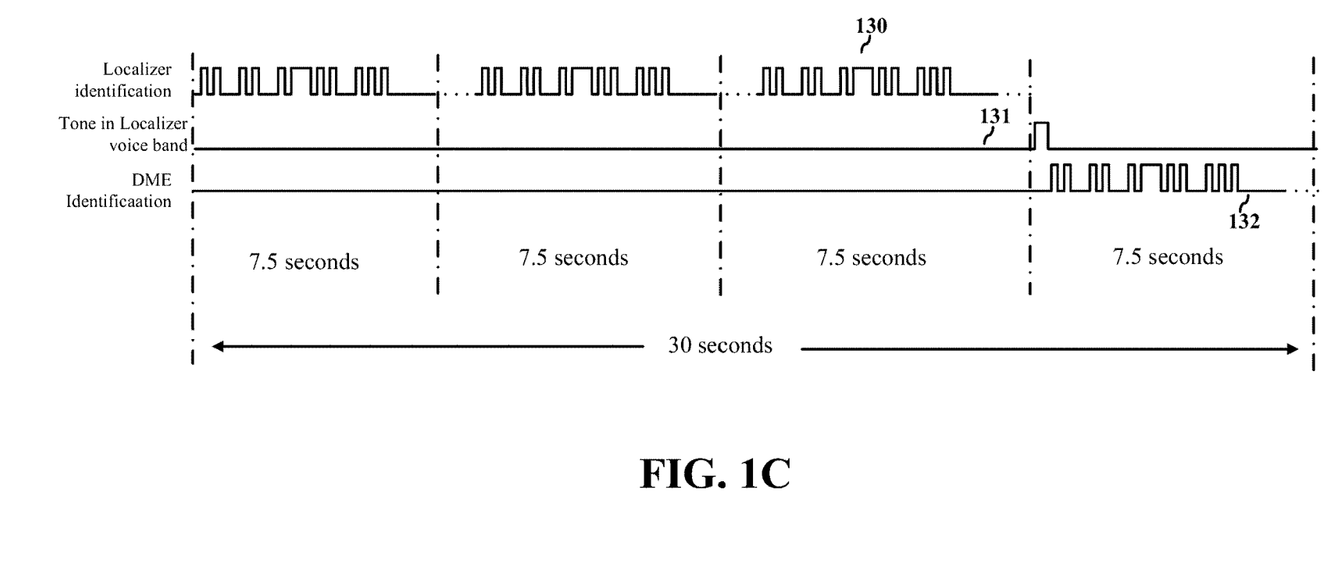
FIG. 1C is a diagram showing the Morse Code identification timing of an ILS system for use in accordance with various aspects of the present disclosure.

FIGS. 1A and 1B each illustrate an overall system diagram of example navigational aid systems 100, 150 for use in accordance with aspects of the present disclosure. The example systems of FIGS. 1A and 1B each includes, for example, an aircraft 102, a runway 116, a navigational aid station 104 (e.g., illustrated in FIG. 1A), first navigational aid equipment 106, and second navigational aid equipment 108. FIG. 1C shows the typical time relationship of the identification signals of an Instrument landing system, which may be used for example, in accordance with aspects of the present disclosure.

As illustrated in FIG. 1A, the navigational aid system 100 includes first navigational aid equipment 106 collocated with second navigational aid equipment 108 in a navigational aid station 104. As illustrated in FIG. 1B, the navigation aid system 150 may include the first navigational aid equipment 106 located remote from the second navigational aid equipment 108. In either system 100, 150, the first navigational aid system 106 may be a DME. The second navigational aid station 108 may be a localizer. The second navigational aid station 108 may broadcast an identification during a predetermined time during a predetermined interval using the voice band. For example, the second navigational aid station may broadcast a Morse code identification three (3) times (7.5 second period) during an interval of 30 seconds The broadcast from the second navigational aid equipment 108 may include an additional tone 112 in the voice band that is received by the first navigational aid station 106. In one example, the modulation frequencies dedicated for the voice band may be, for example, 300 to 3000 Hz.

The additional tone 112 may trigger the first navigational aid equipment 106 to broadcast a synchronized identification signal 114 during a second time period within the 30 second interval. For example, the identification signal 114 may be broadcast by the first navigational aid equipment 106 in a fourth 7.5 second period of the 30 second interval. By using the additional tone 112 to trigger the first navigational aid equipment 106 to start broadcasting the identification signal 114, the navigational aid system 100, 150 of the present disclosure may not need a cable connection for the synchronization of identification signals broadcast by the first navigational equipment 106 and the second navigational aid equipment 108.

The Localizer part of an Instrument Landing system broadcasts the identification signal for the user of a Localizer and Glideslope. It also establishes the timing for an associated DME. Signal 130 is the typical identification signal for a localizer (FIG. 1C). It broadcasts a Morse code signal during three periods inside of an overall 30 second period. In accordance with aspects of the present disclosure, the localizer may then broadcast a triggering signal (131) in the localizer voice band to cause the associated DME to broadcast its identification (132). This approach forces the DME identification to remain synchronous with the Localizer.

Figure 2:
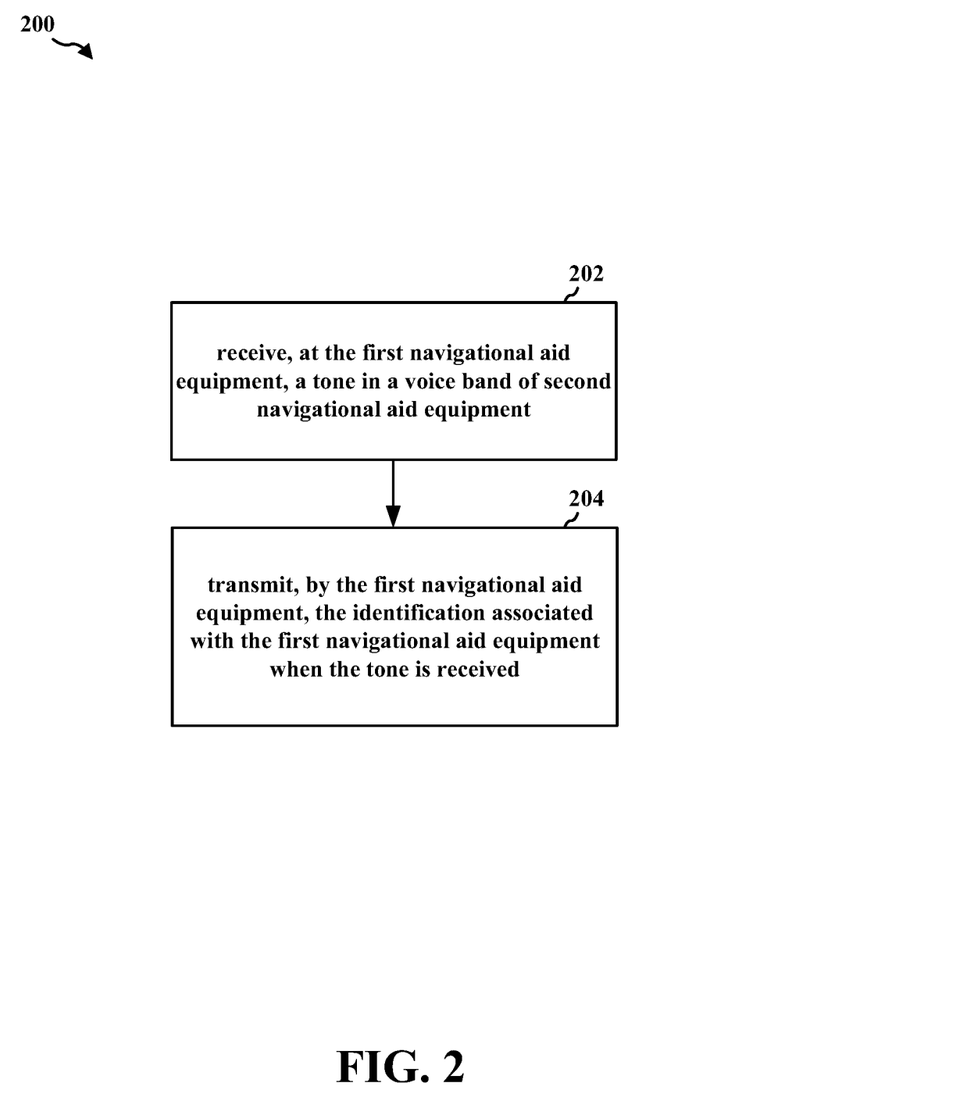
FIG. 2 is a flow diagram illustrating an example method for triggering an identification signal broadcast of a first navigational aid equipment using a tone in the voice band transmitted by a second navigational aid equipment.

FIG. 2 is a flow diagram illustrating an example method 200 for triggering an identification signal broadcast of first navigational aid equipment using a tone in the voice band transmitted by second navigational aid equipment in accordance with various aspects of the present disclosure. The process described in this flow diagram may be implemented and/or performed by the first navigational aid equipment 106 illustrated in FIGS. 1A and 1B. For example, the first navigational aid equipment may include one of a DME.

At block 202, the first navigational aid equipment may receive a tone in a voice band of second navigational aid equipment. For example, referring to FIGS. 1A and 1B, the second navigational aid station 108 may broadcast an identification during a predetermined time during a predetermined interval using the voice band that may be received by the first navigational aid equipment 106. For example, the second navigational aid station may broadcast a Morse code identification three times (each time has an interval of 7.5 seconds) during an interval of 30 seconds. The broadcast from the second navigational aid equipment 108 may include an additional tone 112 in the voice band that is received by the first navigational aid station 106. In one example, the modulation frequencies dedicated for the voice band may be, for example, 300 to 3000 Hz.

At block 204, the first navigational aid equipment may transmit the identification associated with the first navigational aid equipment identification when the tone is received. For example, referring to FIGS. 1A and 1B, the additional tone 112 may trigger the first navigational aid equipment 106 to broadcast a synchronized identification signal 114 during a second time period within the 30 second interval. For example, the identification signal 114 may be broadcast by the first navigational aid equipment 106 in a fourth 7.5 second period of the 30 second interval. By using the additional tone 112 to trigger the first navigational aid equipment 106 to start broadcasting the identification signal 114, the navigational aid system 100, 150 of the present disclosure may not need a cable connection for the synchronization of identification signals broadcast by the first navigational equipment 106 and the second navigational aid equipment 108. In an aspect, the first navigational aid equipment may be collocated with the second navigational aid equipment (as illustrated in FIG. 1A). In another aspect, the second navigation aid equipment may be located remote from the first navigational aid equipment (as illustrated in FIG. 1B). In a further aspect, the first navigational aid equipment may be a DME. In another aspect, the second navigational aid equipment may be a localizer. Furthermore, the tone may be received at a first predetermined time during a predetermined interval in the voice band of the second navigational aid equipment. In another aspect, the identification of the first navigational aid equipment may be transmitted at a second predetermined time during the predetermined interval in the voice band of the second navigational aid equipment. In one aspect, the identification may be a Morse Code identification. In another aspect, the tone may include multiple tone frequencies or a pattern of tones.

Figure 3:
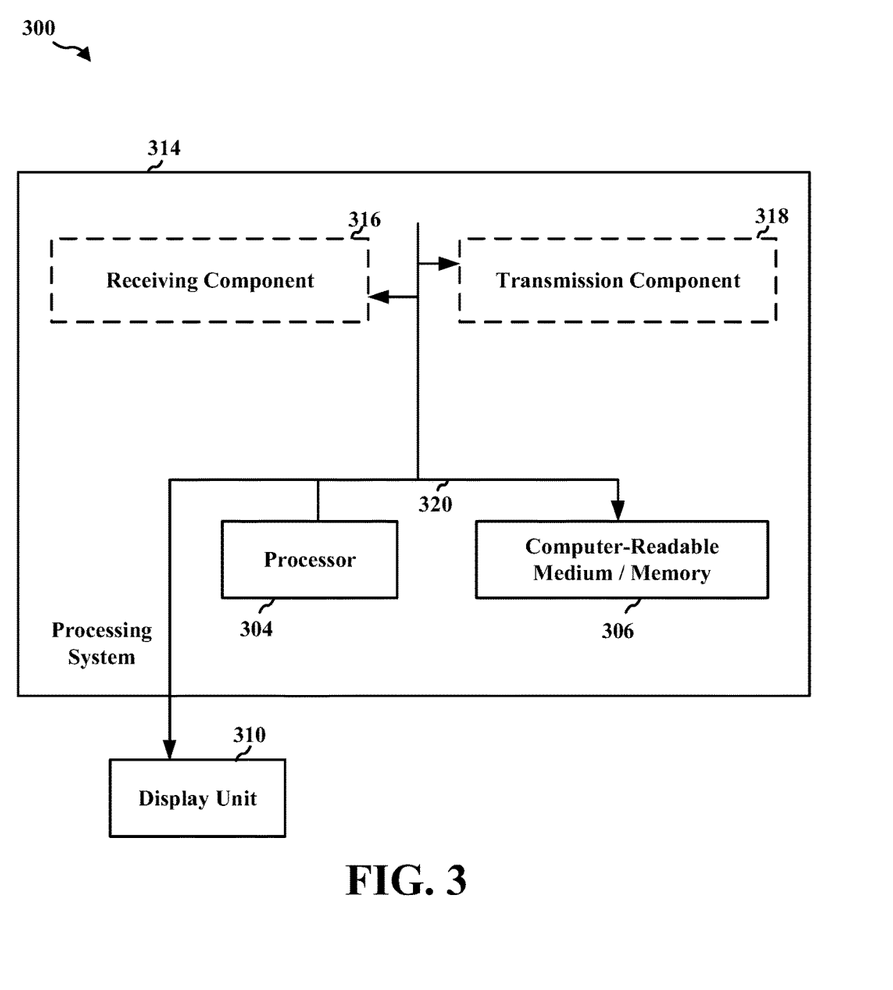
FIG. 3 is a diagram illustrating example aspects of a hardware implementation for a system employing a processing system in accordance with aspects of the present disclosure.

FIG. 3 is a representative diagram illustrating an example hardware implementation for a system 300 employing a processing system 302. The processing system 302 may be implemented with an architecture that links together various circuits, including, for example, one or more processors and/or components, represented by the processor 304, the components 312, 314, 316, 318, 320 and the computer-readable medium/memory 306.

The processing system 302 may be coupled to or connected with navigational aid equipment.

The processing system 302 may include a processor 304 coupled to a computer-readable medium/memory 306 via bus 324. The processor 304 may be responsible for general processing, including the execution of software stored on the computer-readable medium/memory 306. The software, when executed by the processor 304, may cause the processing system 302 to perform various functions described supra for any particular apparatus and/or system. The computer-readable medium/memory 306 may also be used for storing data that is manipulated by the processor 304 when executing software. The processing system may further include at least one of the components 316, 318. The components may comprise software components running in the processor 304, resident/stored in the computer readable medium/memory 306, one or more hardware components coupled to the processor 304, or some combination thereof. The processing system 302 may be a component of the first navigational aid equipment 106, as illustrated in FIGS. 1A and 1B.

The system 300 may further include features for receiving, at first navigational aid equipment, a tone in a voice band of second navigational aid equipment, and transmitting, by the first navigational aid equipment, the identification associated with the first navigational aid equipment identification using the voice band of the second navigational aid equipment when the tone is received.

The aforementioned features may be carried out via one or more of the aforementioned components of the system 300 and/or the processing system 302 configured to perform the functions recited by the aforementioned features.

Thus, aspects may include a system for performing a method for trigger an identification signal broadcast of a first navigational aid equipment using a tone in the voice band transmitted by a second navigational aid equipment, e.g., in connection with FIG. 2.

The system may include additional components that perform each of the functions of the method of the aforementioned flowchart of FIG. 2, or other algorithm. As such, each block in the aforementioned flowchart of FIG. 2 may be performed by a component, and the system may include one or more of those components. The components may include one or more hardware components specifically configured to carry out the stated processes/algorithm, implemented by a processor configured to perform the stated processes/algorithm, stored within a computer-readable medium for implementation by a processor, or some combination thereof.

Thus, aspects may include a non-transitory computer-readable medium for triggering an identification signal broadcast from a first navigational aid equipment, the non-transitory computer-readable medium having control logic stored therein for causing a computer to perform the aspects described in connection with, e.g., FIG. 2.

In yet another example, aspects presented herein may be implemented using a combination of both hardware and software.

Figure 4:
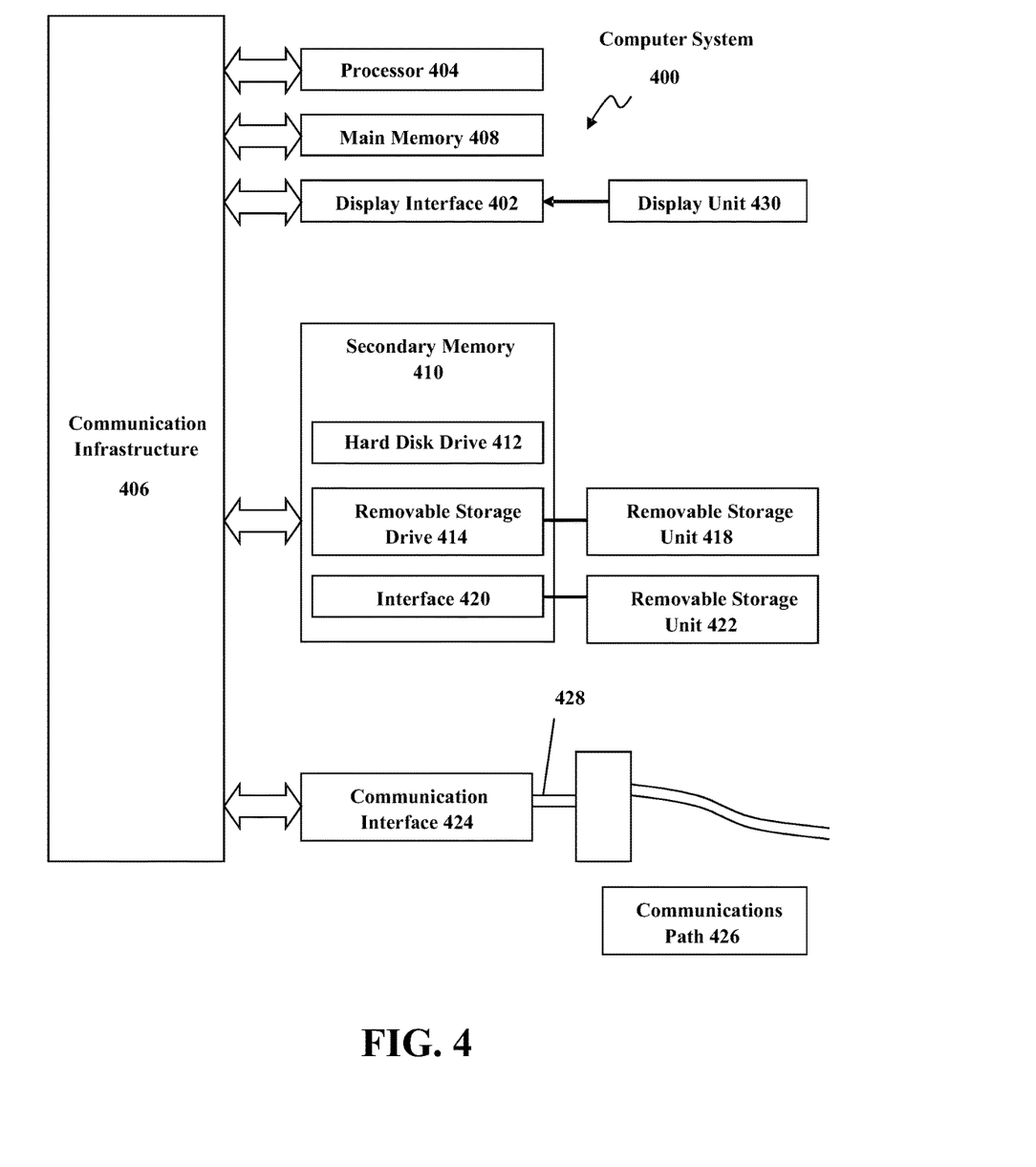
FIG. 4 a system diagram illustrating various example hardware components and other features, for use in accordance with aspects of the present disclosure.

FIG. 4 is an example system diagram of various hardware components and other features, for use in accordance with aspects presented herein. The aspects may be implemented using hardware, software, or a combination thereof and may be implemented in one or more computer systems or other processing systems. In one example, the aspects may include one or more computer systems capable of carrying out the functionality described herein, e.g., in connection with FIG. 2.

In FIG. 4, computer system 400 includes one or more processors, such as processor 404. For example, the processor 404 may be configured for signal processing at navigational aid equipment. The processor 404 is connected to a communication infrastructure 406 (e.g., a communications bus, cross-over bar, or network). Various software aspects are described in terms of this example computer system. After reading this description, it will become apparent to a person skilled in the relevant art(s) how to implement the aspects presented herein using other computer systems and/or architectures.

Computer system 400 may include a display interface 402 that forwards graphics, text, and other data from the communication infrastructure 406 (or from a frame buffer not shown) for display on a display unit 430. In an aspect, the display unit 430 may be included in navigation aid equipment/navigational aid station. Computer system 400 also includes a main memory 408, preferably random access memory (RAM), and may also include a secondary memory 410. The secondary memory 410 may include, for example, a hard disk drive 412 and/or a removable storage drive 414, representing a floppy disk drive, a magnetic tape drive, an optical disk drive, etc. The removable storage drive 414 reads from and/or writes to a removable storage unit 418 in a well-known manner. Removable storage unit 418, represents a floppy disk, magnetic tape, optical disk, etc., which is read by and written to removable storage drive 414. As will be appreciated, the removable storage unit 418 includes a computer usable storage medium having stored therein computer software and/or data.

In alternative aspects, secondary memory 410 may include other similar devices for allowing computer programs or other instructions to be loaded into computer system 400. Such devices may include, for example, a removable storage unit 422 and an interface 420. Examples of such may include a program cartridge and cartridge interface (such as that found in video game devices), a removable memory chip (such as an erasable programmable read only memory (EPROM), or programmable read only memory (PROM)) and associated socket, and other removable storage units 422 and interfaces 420, which allow software and data to be transferred from the removable storage unit 422 to computer system 400.

Computer system 400 may also include a communications interface 424. Communications interface 424 allows software and data to be transferred between computer system 400 and external devices. Examples of communications interface 424 may include a modem, a network interface (such as an Ethernet card), a communications port, a Personal Computer Memory Card International Association (PCMCIA) slot and card, etc. Software and data transferred via communications interface 424 are in the form of signals 428, which may be electronic, electromagnetic, optical or other signals capable of being received by communications interface 424. These signals 428 are provided to communications interface 424 via a communications path (e.g., channel) 426. This path 426 carries signals 428 and may be implemented using wire or cable, fiber optics, a telephone line, a cellular link, wireless communications link, a radio frequency (RF) link and/or other communications channels. In this document, the terms "computer program medium" and "computer usable medium" are used to refer generally to media such as a removable storage drive 480, a hard disk installed in hard disk drive 412, and signals 428. These computer program products provide software to the computer system 400. Aspects presented herein may include such computer program products.

Computer programs (also referred to as computer control logic) are stored in main memory 408 and/or secondary memory 410. Computer programs may also be received via communications interface 424. Such computer programs, when executed, enable the computer system 400 to perform the features presented herein, as discussed herein. In particular, the computer programs, when executed, enable the processor 410 to perform the features described supra with respect to FIGS. 1A, 1B, 1C, 2 and 3. Accordingly, such computer programs represent controllers of the computer system 400.

In aspects implemented using software, the software may be stored in a computer program product and loaded into computer system 400 using removable storage drive 414, hard drive 412, or communications interface 420. The control logic (software), when executed by the processor 404, causes the processor 404 to perform the functions as described herein. In another example, aspects may be implemented primarily in hardware using, for example, hardware components, such as application specific integrated circuits (ASICs). Implementation of the hardware state machine so as to perform the functions described herein will be apparent to persons skilled in the relevant art(s).

While the aspects described herein have been described in conjunction with the example aspects outlined above, various alternatives, modifications, variations, improvements, and/or substantial equivalents, whether known or that are or may be presently unforeseen, may become apparent to those having at least ordinary skill in the art. Accordingly, the example aspects, as set forth above, are intended to be illustrative, not limiting. Various changes may be made without departing from the spirit and scope of the disclosure. Therefore, the disclosure is intended to embrace all known or later-developed alternatives, modifications, variations, improvements, and/or substantial equivalents.

Thus, the claims are not intended to be limited to the aspects shown herein, but are to be accorded the full scope consistent with the language of the claims, wherein reference to an element in the singular is not intended to mean "one and only one" unless specifically so stated, but rather "one or more." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It is understood that the specific order or hierarchy of the processes/flowcharts disclosed is an illustration of example approaches. Based upon design preferences, it is understood that the specific order or hierarchy in the processes/flowcharts may be rearranged. Further, some features/steps may be combined or omitted. The accompanying method claims present elements of the various features/steps in a sample order, and are not meant to be limited to the specific order or hierarchy presented.

Further, the word "example" is used herein to mean "serving as an example, instance, or illustration." Any aspect described herein as "example" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. Nothing disclosed herein is intended to be dedicated to the public regardless of whether such disclosure is explicitly recited in the claims.

The invention claimed is:

1. A method performed by a first navigational aid equipment, comprising:
   receiving, at the first navigational aid equipment, a triggering tone in a voice band of second navigational aid equipment, the triggering tone comprising a tone that causes the first navigational aid equipment to broadcast a synchronization identification signal; and
   responsive to receiving the triggering tone, broadcasting, by the first navigational aid equipment, the synchronization identification signal associated with the first navigational aid equipment in the voice band, wherein the synchronization identification signal comprises a coded identification of the first navigational aid equipment, and wherein the triggering tone does not include an identification of the second navigation aid equipment.

2. The method of claim 1, wherein the first navigational aid equipment is collocated with the second navigational aid equipment.

3. The method of claim 2, wherein the first navigational aid equipment is a distance measuring equipment (DME).

4. The method of claim 3, wherein the second navigational aid equipment is a localizer.

5. The method of claim 1, wherein the second navigation aid equipment is located remote from the first navigational aid equipment.

6. The method of claim 1, wherein the triggering tone is received at a first predetermined time during a predetermined interval in the voice band of the second navigational aid equipment.

7. The method of claim 6, wherein broadcasting the synchronization identification signal comprises broadcasting the synchronization identification signal at a second predetermined time during the predetermined interval in the voice band of the second navigational aid equipment.

8. The method of claim 1, wherein the coded identification of the first navigational aid equipment is a Morse Code identification of the first navigation aid equipment.

9. The method of claim 6, the method further comprising:
   receiving, by the first navigation aid equipment, a Morse Code identification from the second navigation aid equipment in the voice band prior to receiving the triggering tone at the first predetermined time.

10. An apparatus comprising a first navigational aid equipment, the apparatus further comprising:
    a memory; and
    one or more processors coupled to the memory and configured to:
       receive, at the first navigational aid equipment, a triggering tone in a voice band of second navigational aid equipment, the triggering tone comprising a tone that causes the first navigational aid equipment to broadcast a synchronization identification signal; and
       broadcast, by the first navigational aid equipment, the synchronization identification signal associated with the first navigational aid equipment in the voice band responsive to the reception of the triggering tone, wherein the synchronization identification signal comprises a coded identification of the first navigational aid equipment, and wherein the triggering tone does not include an identification of the second navigation aid equipment.

11. The apparatus of claim 10, wherein the first navigational aid equipment is collocated with second navigational aid equipment.

12. The apparatus of claim 11, wherein the first navigational aid equipment is a distance measuring equipment (DME).

13. The apparatus of claim 12, wherein the second navigational aid equipment is a localizer.

14. The apparatus of claim 10, wherein the second navigation aid equipment is located remote from the first navigational aid equipment.

15. The apparatus of claim 10, wherein the triggering tone is received at a first predetermined time during a predetermined interval in the voice band of the second navigational aid equipment.

16. The apparatus of claim 15, wherein the one or more processors are further configured to broadcast the synchronization identification signal by broadcasting the synchronization identification signal at a second predetermined time during the predetermined interval in the voice band of the second navigational aid equipment.

17. The apparatus of claim 10, wherein the coded identification of the first navigational aid equipment is a Morse Code identification of the first navigational aid equipment.

18. An apparatus comprising a first navigational aid equipment, the apparatus configured to:
receive, at the first navigational aid equipment, a triggering tone in a voice band of second navigational aid equipment, the triggering tone comprising a tone that causes the first navigational aid equipment to broadcast a synchronization identification signal; and
broadcast, by the first navigational aid equipment, the synchronization identification signal associated with the first navigational aid equipment in the voice band responsive to the reception of the triggering tone, wherein the synchronization identification signal comprises a coded identification of the first navigational aid equipment, and wherein the triggering tone does not include an identification of the second navigation aid equipment.

19. A computer-readable medium storing computer executable code embodied on a non-transitory computer-readable medium of a first navigational aid equipment, the computer-readable medium comprising executable code for:
receiving, at the first navigational aid equipment, a triggering tone in a voice band of second navigational aid equipment, the triggering tone comprising a tone that causes the first navigational aid equipment to broadcast a synchronization identification signal; and
responsive to receiving the triggering tone, broadcasting, by the first navigational aid equipment, the synchronization identification signal associated with the first navigational aid equipment in the voice band, wherein the synchronization identification signal comprises a coded identification of the first navigational aid equipment, and wherein the triggering tone does not include an identification of the second navigation aid equipment.

* * * * *